US006513549B2

(12) United States Patent
Chen

(10) Patent No.: US 6,513,549 B2
(45) Date of Patent: Feb. 4, 2003

(54) PLUG STRUCTURE OF A LIQUID DRAINAGE INSTALLATION

(75) Inventor: Philip Chen, Hsin-chu (TW)

(73) Assignee: Avision Inc., Hsin Chu (TW)

( * ) Notice: Subject to any disclaimer, the term of this patent is extended or adjusted under 35 U.S.C. 154(b) by 0 days.

(21) Appl. No.: 09/960,663

(22) Filed: Sep. 24, 2001

(65) Prior Publication Data

US 2003/0000590 A1 Jan. 2, 2003

(30) Foreign Application Priority Data

Jul. 2, 2001 (TW) .................................. 090211043

(51) Int. Cl.[7] ................................................ F16L 55/10
(52) U.S. Cl. ............................ 138/89; 138/92; 4/295; 220/235; 220/238
(58) Field of Search .................... 138/89, 92; 4/295; 220/234, 235, 237, 238

(56) References Cited

U.S. PATENT DOCUMENTS

| 303,558 | A | * | 8/1884 | Campbell | |
|---|---|---|---|---|---|
| 3,494,504 | A | * | 2/1970 | Jackson | 138/89 |
| 3,613,936 | A | * | 10/1971 | Kaiser et al. | 138/89 |
| 4,312,708 | A | * | 1/1982 | Leslie | 138/89 |
| 4,457,030 | A | * | 7/1984 | Burry | 4/286 |
| 4,493,344 | A | * | 1/1985 | Mathison et al. | 138/89 |
| 4,585,033 | A | * | 4/1986 | Westman | 138/89 |
| 4,817,671 | A | * | 4/1989 | Mathison et al. | 138/90 |
| 5,035,266 | A | * | 7/1991 | Benson et al. | 138/89 |
| 5,044,403 | A | * | 9/1991 | Chen | 138/89 |
| 5,307,841 | A | * | 5/1994 | Condon | 138/89 |
| 5,845,800 | A | * | 12/1998 | Shaw et al. | 220/238 |
| 6,066,119 | A | * | 5/2000 | Ball | 4/286 |
| 6,193,093 | B1 | * | 2/2001 | Brunner | 220/234 |
| 6,226,806 | B1 | * | 5/2001 | Ball | 4/286 |

* cited by examiner

Primary Examiner—James Hook
(74) Attorney, Agent, or Firm—Charles E. Baxley

(57) ABSTRACT

A plug structure of a liquid drainage installation includes a sealing ring clamped between two combined half bodies. The outer periphery of the sealing ring protrudes outward from the outer periphery of the two half bodies. Thus, the protruding dimension of the sealing ring may be adjusted by the clamping extent of the two bodies, thereby compensating the wearing amount due to usage. The two half bodies may be separated easily, thereby facilitating replacing the sealing ring.

6 Claims, 5 Drawing Sheets

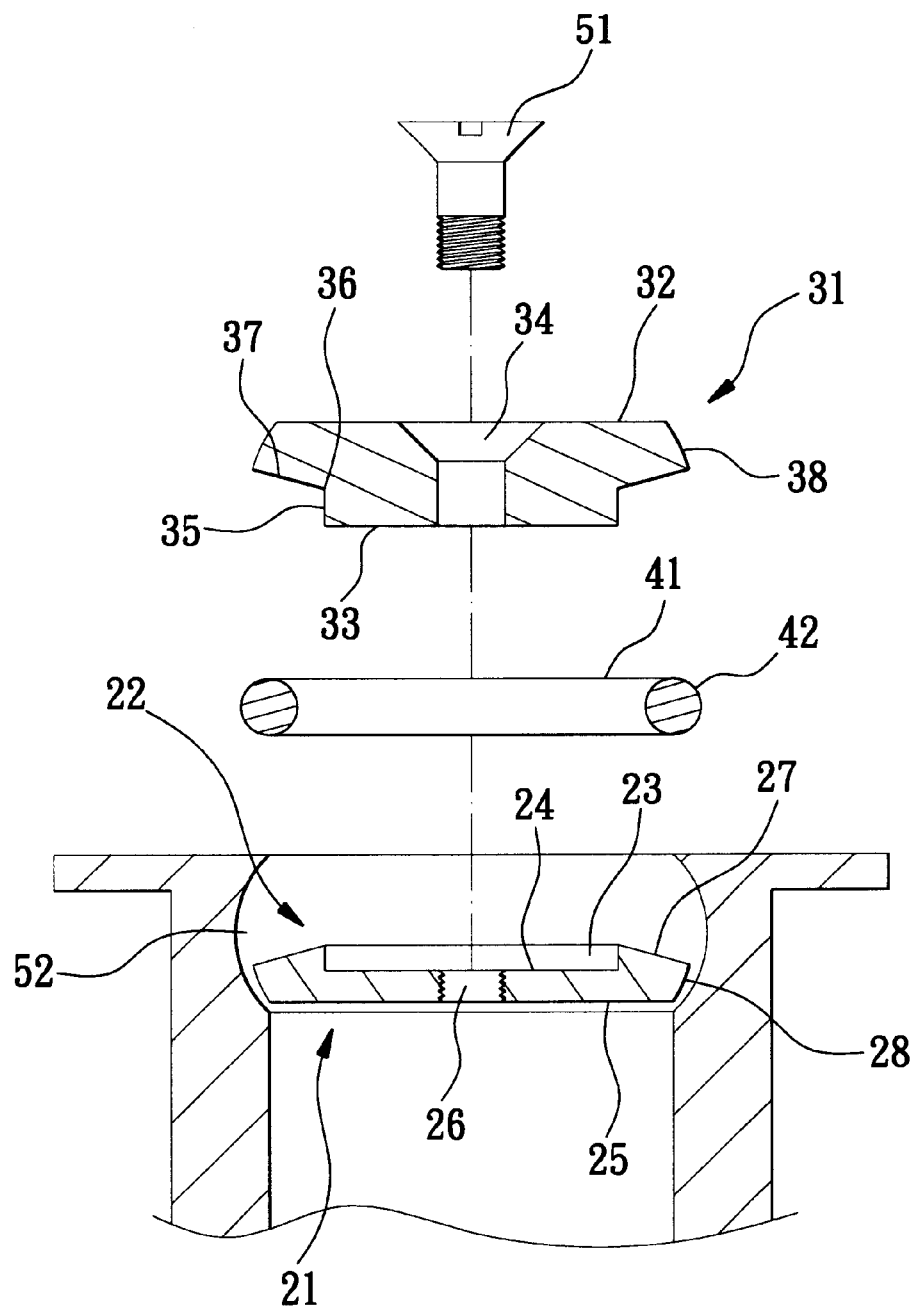
F I G. 3

PLUG STRUCTURE OF A LIQUID DRAINAGE INSTALLATION

BACKGROUND OF THE INVENTION

1. Field of the Invention

The present invention relates to a plug structure, and more particularly to a plug structure used in an equipment such as a water tank, bath tub or other liquid storage tank.

2. Description of the Related Art

An early liquid drainage installation (such as the liquid drainage installation of the water tank) is provided with a plug made of rubber for blocking in the water drain hole, thereby preventing the water in the liquid drainage installation from being lost. The rubber plug may prevent the water from being drained. However, the user has to exert a large force to press or remove the plug, thereby causing inconvenience in operation. In addition, the plug is easily lost, thereby causing inconvenience to the user.

A similar plug structure includes a plug connected to a chain which is combined with the water drainage installation. Thus, the plug will not be lost, and the plug may be removed from the water drain hole by pulling the chain to drain water. However, the chain is immersed in the water drainage installation when the plug blocks the water drain hole. Thus, the chain may be pulled unintentionally to drain water. In addition, dirt may remain on the chain, thereby causing the sanitary problem.

A recent liquid drainage installation includes a plug structure linked by a lever. A push button or handle may be mounted on the water drainage equipment at the position that is not touched easily, to control the plug to block in or remove from the water drain hole, thereby preventing draining water due to an unintentional touch. However, the lever type structure is directly mounted in the water drain hole, and the entire structure is more complicated with an expensive price. In addition, only a professional technician can clean the water drain hole, and a longer treatment period is needed.

A conventional plug structure of a liquid drainage installation in accordance with the prior art as shown in FIG. 1 includes a block 11 having a circumferential portion 12 inserted with a sealing ring (such as an O-ring) 13. The combination of the block 11 and the sealing ring 13 is mounted in the water drain hole 14. The block 11 is disposed in a horizontal manner, so that the sealing ring 13 closely abuts the inner wall face 15 of the water drain hole 14, thereby blocking the water drain hole 14. The block 11 may be rotated to the position as shown in phantom lines so as to open the water drain hole 14 for draining water.

The conventional plug structure as shown in FIG. 1 has a simple structure without incurring an unintentional touch. However, the sealing ring 13 will be worn during a period of time, so that it cannot closely urge the inner wall face 15 of the water drain hole 14. Thus, the water in the water drainage installation will be lost gradually, thereby affecting the sealing effect of the plug. The solving method is to remove and replace the plug. However, it is difficult to remove the plug.

SUMMARY OF THE INVENTION

The primary objective of the present invention is to provide a plug structure, wherein when the sealing ring is worn and cannot entirely stop the water, the water stopping effect of the sealing ring may be restored by a simple adjustment action.

For achieving the above-mentioned purpose, a sealing ring may be clamped between two combined half bodies. The protruding dimension of the sealing ring may be adjusted by the clamping extent of the two bodies, thereby adjusting the water stopping effect of the sealing ring.

In addition, when the sealing ring needs to be replaced, the user only needs to remove one half body to remove the sealing ring and replace the sealing ring, so that the sealing ring may be replaced easily and quickly.

Further benefits and advantages of the present invention will become apparent after a careful reading of the detailed description with appropriate reference to the accompanying drawings.

BRIEF DESCRIPTION OF THE DRAWINGS

FIG. 3 is a cross-sectional view of the plug structure of a liquid drainage installation as shown in FIG. 2;

DETAILED DESCRIPTION OF THE PREFERRED EMBODIMENT OF THE INVENTION

Figure 1:
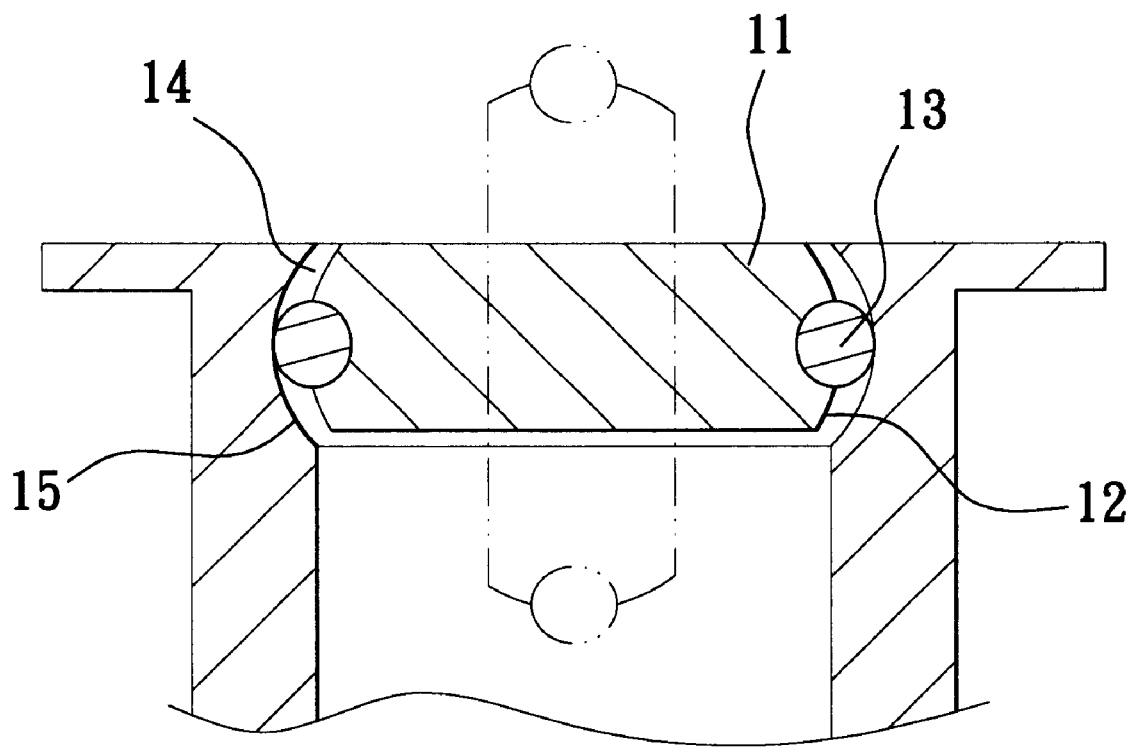
FIG. 1 is a schematic view showing a conventional plug structure.
Figure 2:
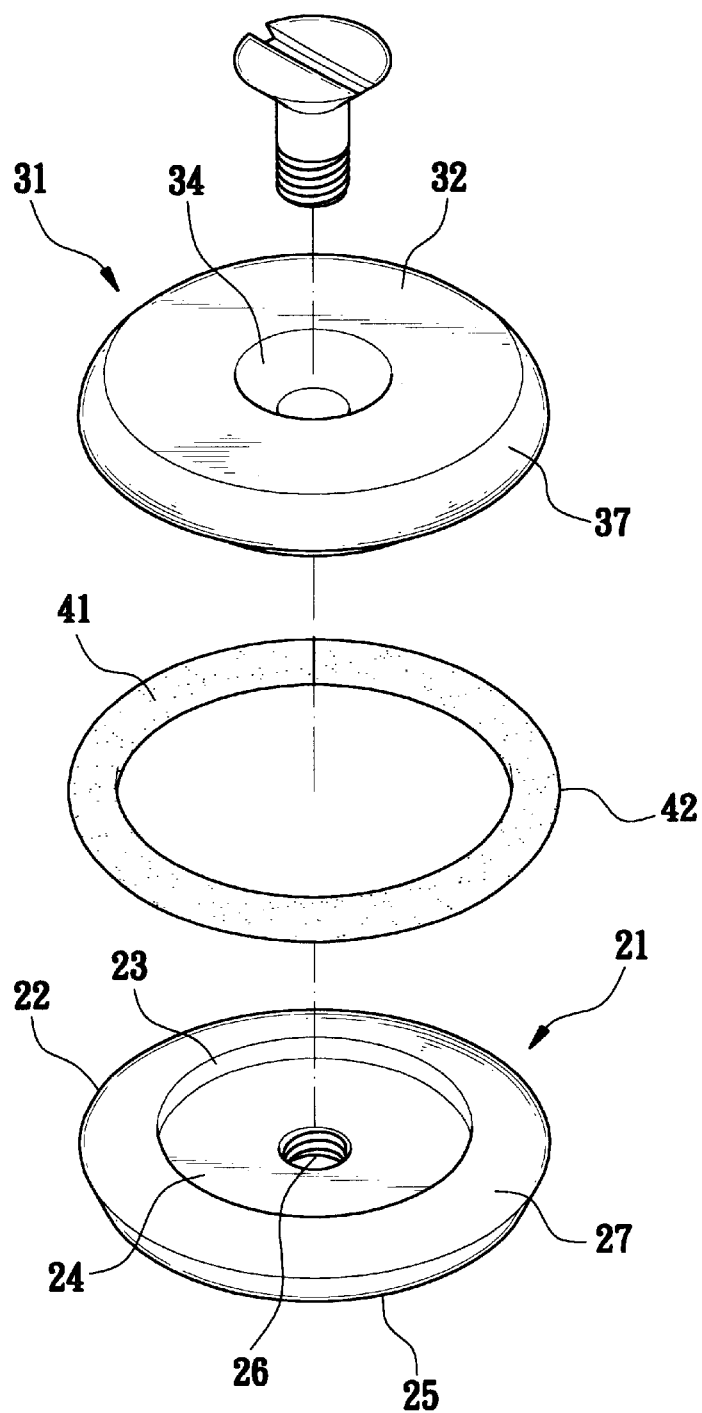
FIG. 2 is an exploded pictorial view of a plug structure of a liquid drainage installation in accordance with the present invention.

Referring to FIGS. 2 and 3, a plug structure of a liquid drainage installation in accordance with the present invention consists of a first half body 21, a second half body 31, and a sealing ring 41.

The first half body 21 is a disk block, and has a first face 22 formed with a concave 23 in the center of the first face 22. The concave 23 has a bottom face 24 and is formed with a screw hole 26 toward the second face 25 of the first half body 21. The first face 22 has a peripheral surface formed with an inclined peripheral face 27 which has a higher inner portion and a lower outer portion. The first half body 21 has a circumferential portion 28 formed with an arched face.

The sealing ring 41 is an O-ring made of rubber, and has an inner diameter greater than an outer diameter of the first half body 21.

The second half body 31 is a disk block, and has a first face 32 formed with a through hole 34 toward the second face 33 of the second half body 31. The second face 33 is formed with a lug 35 having an outer diameter smaller than that of the first face 32. Thus, a corner structure 36 is formed between the lug 35 and the first face 32. The corner structure 36 between the lug 35 and the first face 32 is formed with an inclined peripheral face 37 which has a lower inner portion and a higher outer portion. The second half body 31 has a circumferential portion 38 formed with an arched face.

Figure 4:
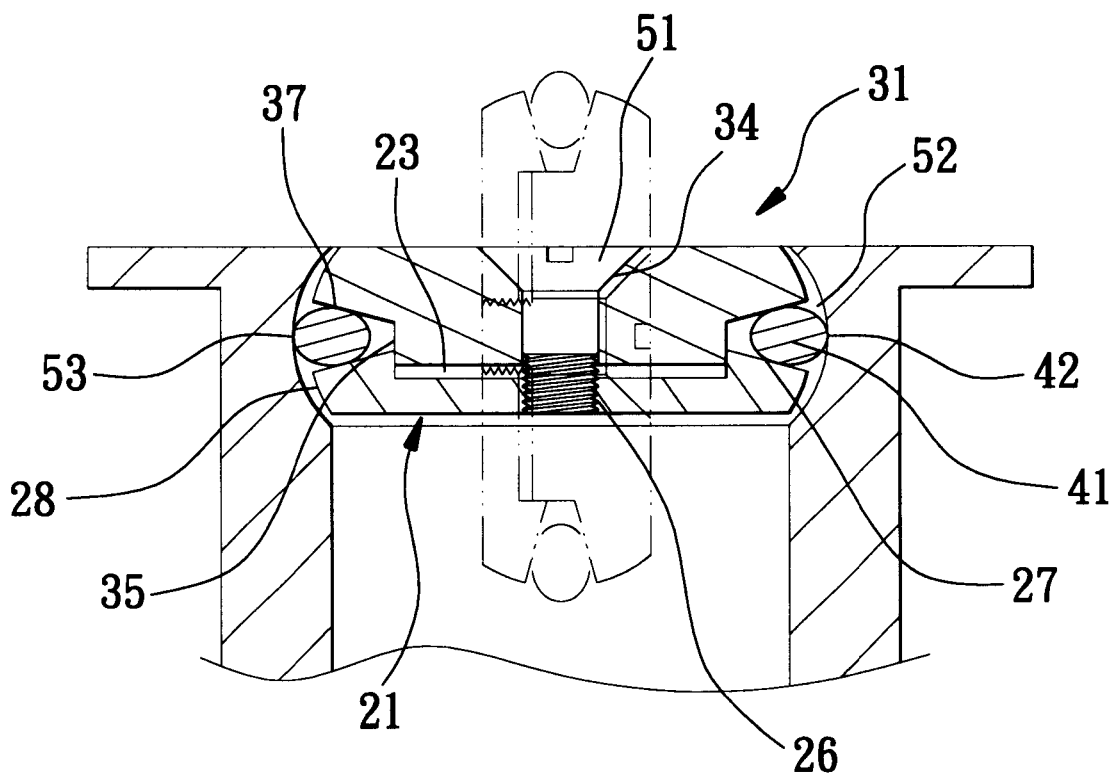
FIG. 4 is an assembly view of the plug structure of a liquid drainage installation as shown in FIG. 3.

Referring to FIG. 4, when in assembly, the sealing ring 41 is mounted on the inclined peripheral face 27 of the first half body 21. Because the outer diameter of the sealing ring 41 is greater than that of the first half body 21, the outer periphery 42 of the sealing ring 41 protrudes outward from the circumferential portion 28 of the first half body 21.

Then, the second half body 31 is mounted on the first half body 21. At this time, the lug 35 of the second half body 31 is received in the concave 23 of the first half body 21, thereby positioning the first half body 21 and the second half body 31. The inclined peripheral face 37 of the second half body 31 is pressed on the sealing ring 41, and the outer periphery 42 of the sealing ring 41 protrudes outward from the circumferential portion 38.

A screw 51 passes through the through hole 34 of the second body 31, and is locked in the screw hole 26 of the first half body 21 to combine the first half body 21 and the second half body 31, so that the first half body 21 and the second half body 31 cannot be separated. The first half body 21 and the second half body 31 may also be combined by other locking manner.

The combination of the first half body 21, the sealing ring 41, and the second half body 31 is placed in the water drain hole 52 in a horizontal manner. At this time, the outer periphery 42 of the sealing ring 41 protrudes outward from the circumferential portion 28 of the first half body 21 and protrudes outward from the circumferential portion 38 of the second half body 31. Thus, the protruding outer periphery 42 of the sealing ring 41 is closely rested on the inner wall face 53 of the water drain hole 52, thereby stopping the water.

The user may rotate the combination of the first half body 21 and the second half body 31 to the position as shown in phantom lines, so that the water drain hole 52 is opened, thereby draining the water conveniently.

In the plug structure of the combination of the first half body 21, the sealing ring 41, and the second half body 31, although the outer periphery 42 of the sealing ring 41 continuously rubs the inner wall face 53 of the water drain hole 52 thereby wearing the sealing ring 41, the design of the present invention may easily overcome the wearing problem of the sealing ring 41.

Figure 5:
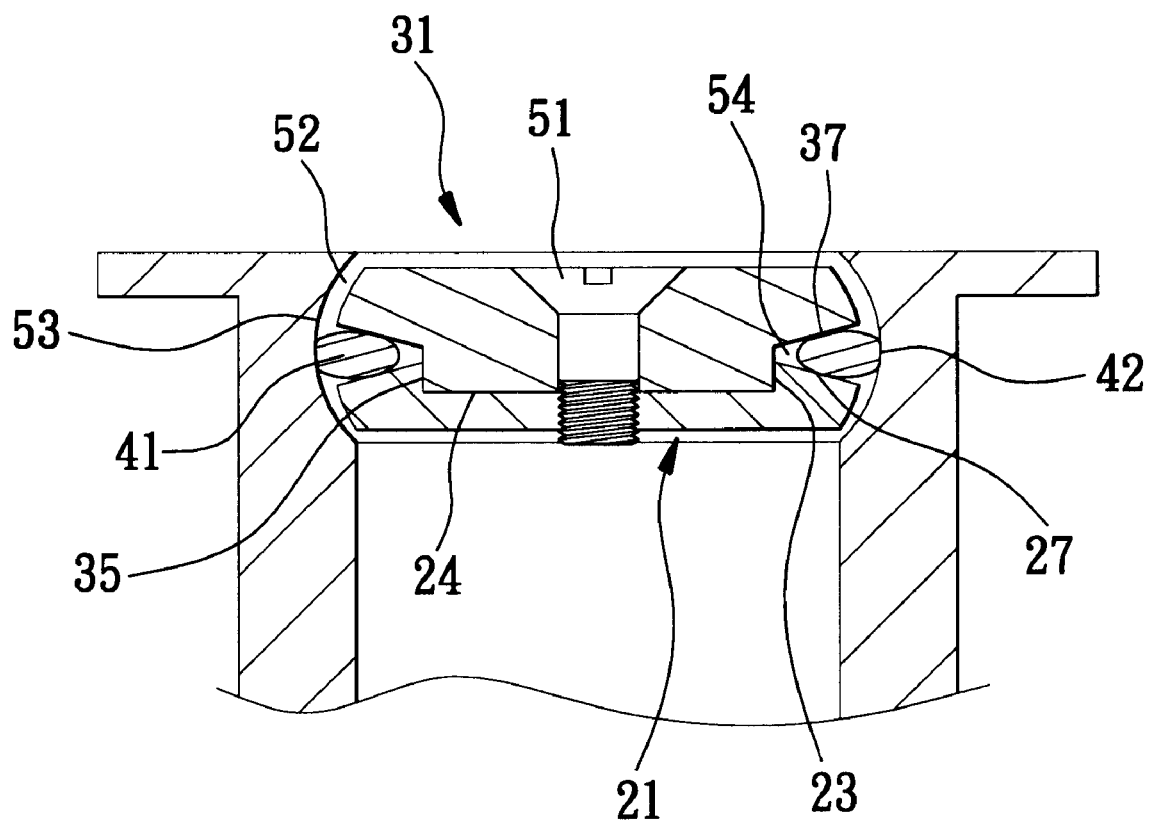
FIG. 5 is a schematic operational view of the plug structure of a liquid drainage installation as shown in FIG. 4 in use.

Referring to FIG. 5, the inclined peripheral face 27 of the first half body 21 and the inclined peripheral face 37 of the second half body 31 form a clamping space 54 which has a wider outer portion and a narrower inner portion. Thus, when the sealing ring 41 is worn to affect the sealing effect, the screw 51 may be rotated so as to clamp the first half body 21 and the second half body 31 more closely. Thus, the clamping space 54 may naturally squeeze the sealing ring 41 toward the inner wall face 53 of the water drain hole 52, so that the outer periphery 42 of the sealing ring 41 is closely rested on the inner wall face 53 of the water drain hole 52.

When the lug 35 of the second half body 31 reaches the bottom face 24 of the concave 23 of the first half body 21, the first half body 21 and the second half body 31 cannot further clamp the sealing ring 41. Thus, the sealing ring 41 has to be replaced if it cannot stop the water.

Again referring to FIG. 3, the screw 51 can be removed for replacing the sealing ring 41. Then, the second half body 31 and the worn sealing ring 41 are removed from the water drain hole 52. Then, a new sealing ring 41 is mounted on the first half body 21. Then, the second half body 31 is locked on the first half body 21 by the screw 51. At this time, the new sealing ring 41 clamped between the first half body 21 and the second half body 31 may efficiently provide the sealing effect. Thus, the replacement action of the present invention is very simple, so that ordinary people may accomplish the replacement work.

An additional O-ring (not shown) may be mounted between the screw 51 and the through hole 34, or the screw hole 26 may be made not to pass through the first half body 21, thereby preventing the liquid from leaking through the screw 51 and the through hole 34. In addition, the first half body 21 may be formed with a lug, and the second half body 31 may be formed with a concave, thereby positioning the first half body 21 and the second half body 31.

The plug structure in accordance with the present invention may be used to block a liquid such as water, oil, wine, tea or the like.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A plug structure of a liquid drainage installation for being installed into a hole formed in the liquid drainage installation, the plug structure comprising:

a first half body;

a sealing ring, mounted on said first half body, and having an outer periphery protruding outward from an outer periphery of said first half body; and a second half body, combined with said first half body and pressed on said sealing ring, for adjusting a dimension of said outer periphery of said sealing ring protruding outward from said outer periphery of said first half body and an outer periphery of said second half body; wherein, said first half body, said sealing ring and said second half body are combined with each other integrally to form an assembly which is capable of rotating from a substantially horizontal state for closing the hole to a substantially vertical state for opening the hole, with the assembly at least partially contained in the hole, wherein said outer periphery of said sealing ring completely contacts the hole at said substantially horizontal state, and said outer periphery of said sealing ring partially contacts the hole at said substantially vertical state.

2. The plug structure of a liquid drainage installation in accordance with claim 1, wherein said first half body has a side surface formed with an inclined peripheral face which has a higher inner portion and a lower outer portion, and said second half body has a side surface formed with an inclined peripheral face which has a lower inner portion and a higher outer portion to align with said inclined peripheral face of said first half body, and said sealing ring is mounted between said inclined peripheral face of said first half body and said inclined peripheral face of said second half body.

3. The plug structure of a liquid drainage installation in accordance with claim 1, wherein said first half body has a side surface formed with a concave, and said second half body has a side surface formed with a lug to mate with said concave of said first half body, and said lug is received in said concave when said first half body is combined with said second half body.

4. The plug structure of a liquid drainage installation in accordance with claim 1, wherein said first half body is combined with said second half body by a screw.

5. The plug structure of a liquid drainage installation in accordance with claim 1, wherein said first half body has a circumferential portion formed with an arched face.

6. The plug structure of a liquid drainage installation in accordance with claim 1, wherein said second half body has a circumferential portion formed with an arched face.

* * * * *